United States Patent Office 3,491,475
Patented Jan. 27, 1970

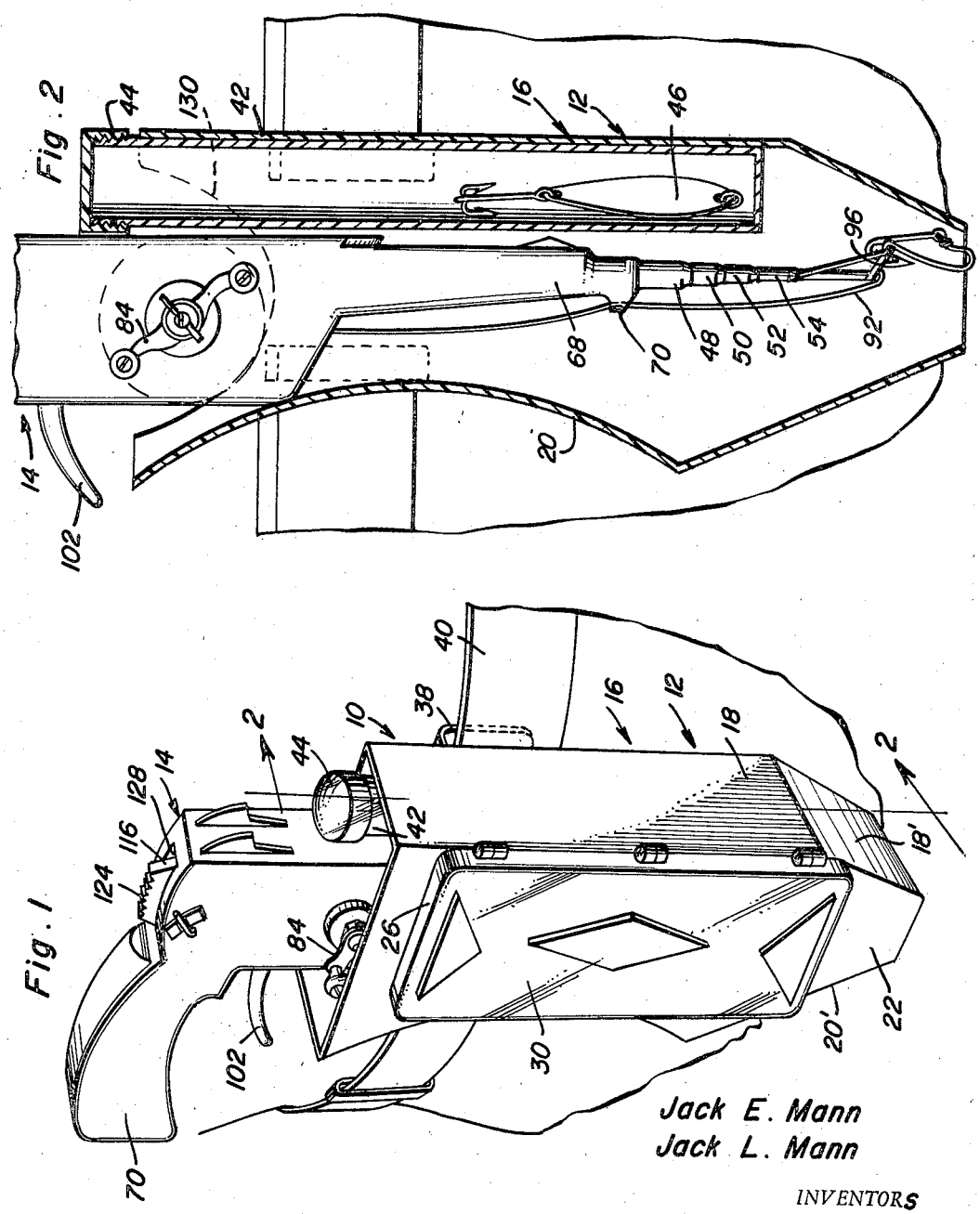

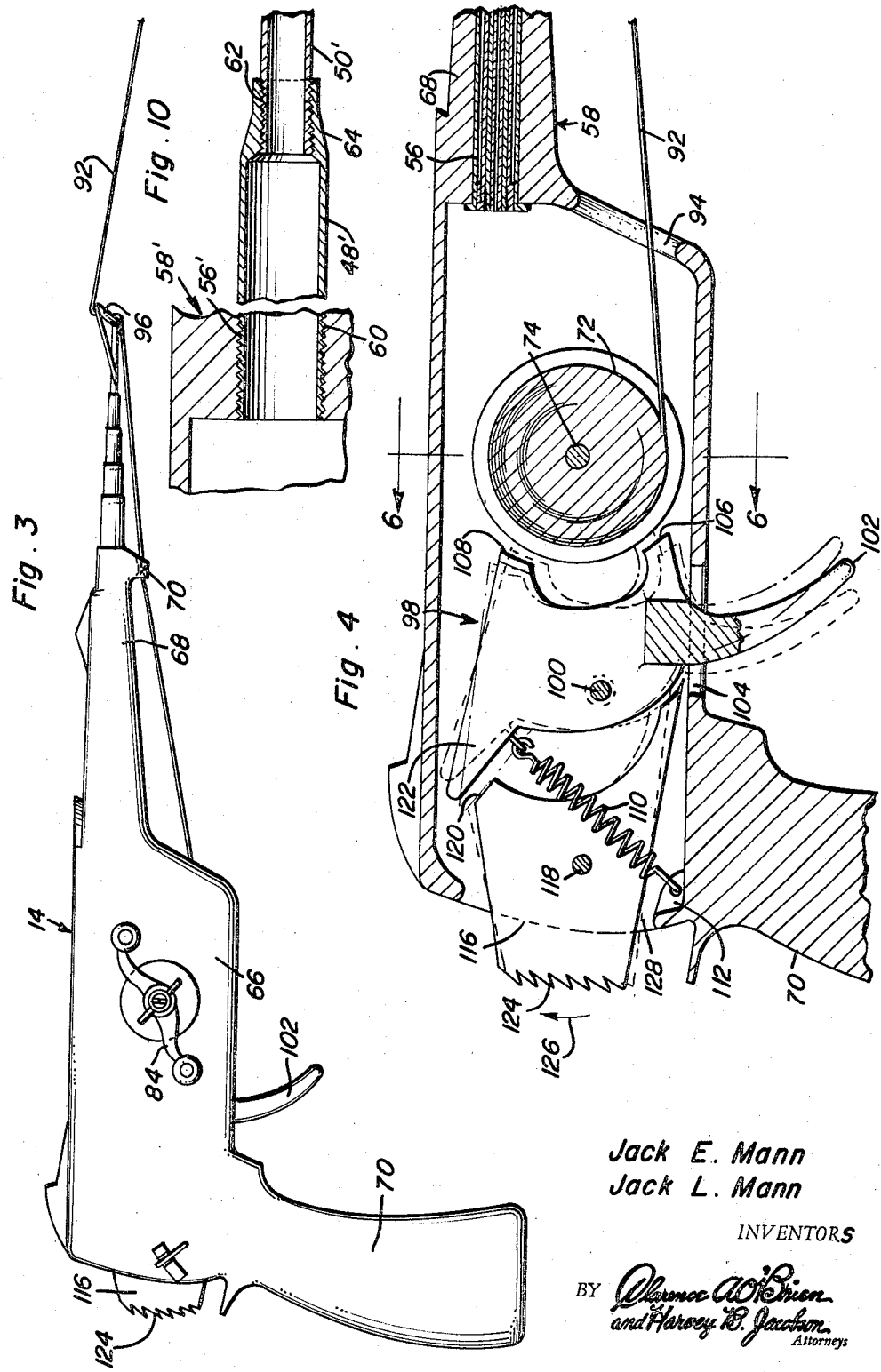

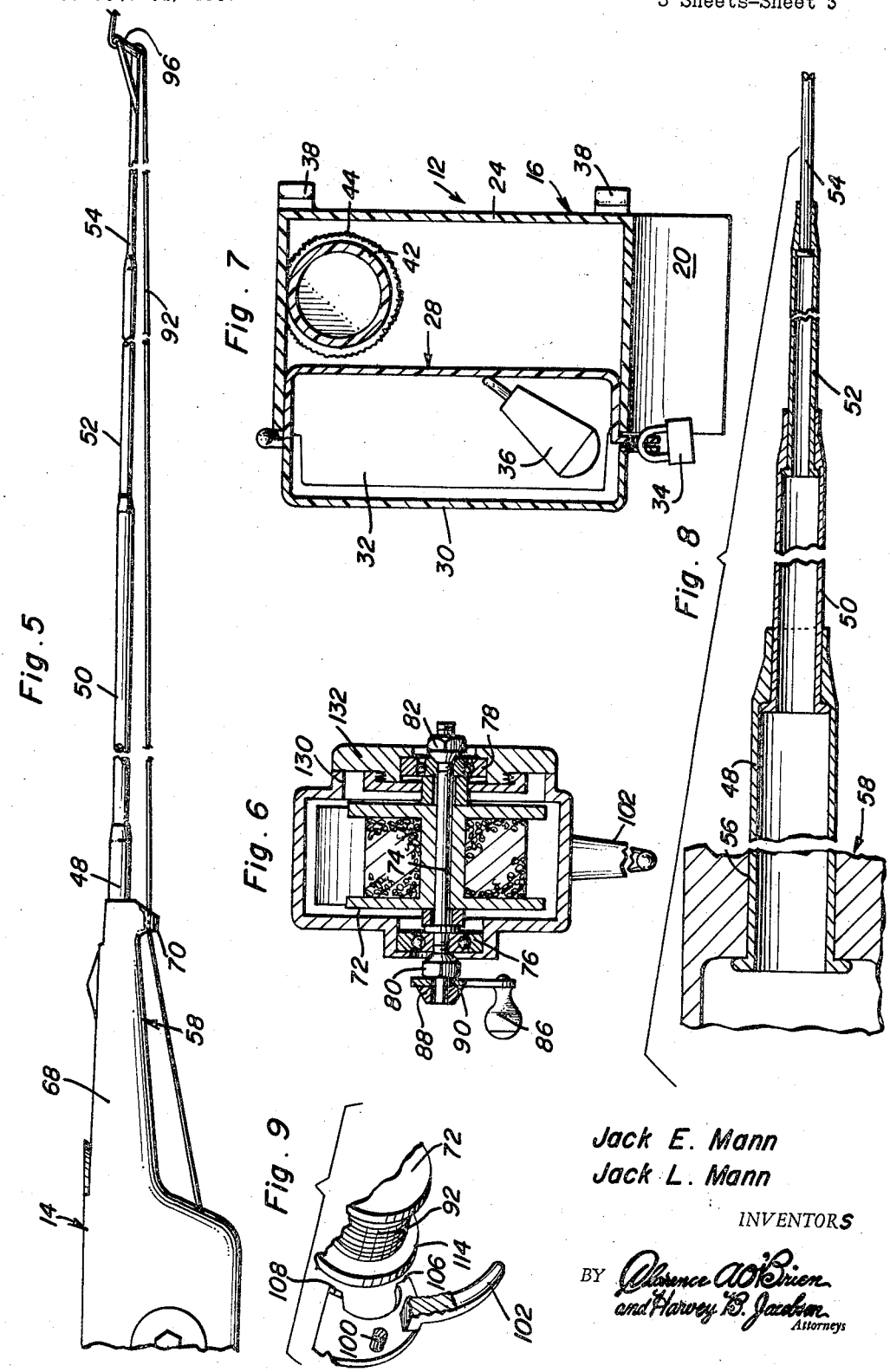

3,491,475
COLLAPSIBLE FISHING GEAR
Jack E. Mann and Jack L. Mann, both of Rte. 1, Box 165,
Deer River, Minn. 56636
Filed Oct. 31, 1967, Ser. No. 679,483
Int. Cl. A01k 87/06, 89/02
U.S. Cl. 43—20                                      7 Claims

ABSTRACT OF THE DISCLOSURE

An elongated fishing rod construction including a handle end in the form of a pistol grip and a rotatable reel for winding fishing line thereon and provided with a crank actuator disposed slightly forward of and to one side of the pistol grip. The fishing rod further being provided with adjustable friction drag or brake means for the reel and control means for the brake means in the form of a trigger element conventionally positioned in relation to the pistol grip and operative when released to apply a light drag on said reel, to completely deactivate the reel brake means when partially actuated and to fully brake the reel means when fully actuated.

---

The collapsible fishing gear of the instant invention includes a telescoping rod section composed of a plurality of telescopingly engaged rod elements and the handgrip of the fishing gear is carried by the base end of the larger telescoped rod element.

One of the basic concepts of the instant invention is to provide the pistol grip on the base end of a fishing rod structure whereby the fishing rod may be aimed in the same manner in which a long barreled handgun is aimed. While fishermen are able to accurately cast a lure or bait when utilizing a conventional fishing rod including a longitudinally extending handle portion, the provision of a pistol grip on a fishing rod provides a means whereby even greater casting accuracy may be obtained. Further, greater flexibility of wrist movement is enabled by the use of a pistol grip handle on a fishing rod such that the wrist may be freely oscillated to swing the tip of the fishing rod from side to side while landing or reeling in a fish. Further, by providing a pistol grip handle on a fishing rod the hand of a fisherman may be more advantageously used to absorb, in conjunction with the flexibility of the associated fishing rod, the pulls and jerks of a fish on a fishing line. Thus, the "feel" of the pull on the rod is more sensitive when a pistol grip is used on a fishing rod.

The main object of this invention is to provide a fishing rod including a pistol grip portion.

A further object of this invention is to provide a fishing rod in accordance with the preceding object and including a telescoping rod portion whereby the entire fishing rod may be constructed so as to be collapsible to the general configuration of a pistol and to therefore be received in a holster-type carrier for the fishing rod.

Still another object of this invention is to provide a holster-type carrier for a fishing rod of the instant invention.

Another object of this invention is to provide a holster-type carrier in accordance with the preceding object and including lure receiving compartment means whereby a fisherman's favorite lure may be readily stored in a compact manner together with the pistol-type fishing rod and holster therefor.

A final object of this invention to be specifically enumerated herein is to provide an apparatus in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the collapsible fishing gear of the instant invention;

FIGURE 2 is an enlarged fragmentary sectional view taken substantially upon the plane indicated by the section line 2—2 of FIGURE 1;

FIGURE 3 is a side elevational view of the fishing gear with the rod portion in a collapsed position;

FIGURE 4 is an enlarged fragmentary longitudinal sectional view taken substantially upon a plane passing through the center of the base end of the fishing rod;

FIGURE 5 is a fragmentary elevational view similar to that of FIGURE 3 but illustrating the rod portion in an extended position;

FIGURE 6 is a transverse sectional view taken substantially upon the plane indicated by section line 6—6 of FIGURE 4;

FIGURE 7 is a horizontal sectional view taken substantially upon a plane passing through the holster portion of the invention centrally intermediate its upper and lower end;

FIGURE 8 is an enlarged fragmentary longitudinal vertical sectional view taken substantially upon a plane passing through the extendible rod portion of the fishing gear;

FIGURE 9 is a fragmentary exploded perspective view of the winding reel and the combined trigger and friction brake and drag mechanism; and FIGURE 10 is an enlarged fragmentary longitudinal vertical sectional view similar to the left hand portion of FIGURE 8, but of a slightly modified form of the invention.

Referring now more specifically to the drawings the numeral 10 generally designates the fishing gear of the instant invention which includes a holster assembly generally referred to by the reference numeral 12 and a fishing rod assembly generally referred to by the reference numeral 14.

The holster assembly includes a housing 16 consisting of front and rear walls 18 and 20 interconnected by means of outer and inner walls 22 and 24. The lower ends of the front and rear walls 18 and 20 include downwardly converging end portions 18' and 20' and the upper end of housing 16 is open.

An opening 26 is formed in the outer side wall 22 and has a bait, lure, and small parts receptacle generally referred to by the reference numeral 28 secured therein. The receptacle 28 includes a hinged cover 30 which may be readily opened to provide access to the various compartments defined between each pair of adjacent partitions 32 which are secured in the receptacle 28. The cover 30 may be secured in a closed position by the utilization of a small lock 34 and any suitable items such as the sinker 36 may be stored within the compartment defined between the partitions 32. Further, the inner side wall 24 of the housing 16 includes a pair of downturned belt engaging hooks 38 adapted to hook over the belt 40 of the wearer of the holster assembly 12. Also, the holster assembly has secured therein a tubular receptacle 42 including a removable top 44 and in which elongated lures such as lure 46 may be stored. The top 44 is in the form of an internally threaded cap and the cap 44 is threadedly engageable with the externally threaded upper end of the tubular receptacle 42.

The fishing rod assembly 14 includes a plurality of fishing rod elements 48, 50 and 54. The latter progressively decrease in diameter and are telescopingly engaged with each other in order that the fishing rod elements may be extended and retracted between the positions thereof illustrated in FIGURES 3 and 8 of the drawings. The element 48 includes a flared base end which is secured in a bore 56 formed in a handle assembly generally referred to by reference numeral 58 and the fishing rod elements 50, 52 and 54 include flanged end portions telescopingly received in the elements 48, 50 and 52.

The flanged ends of the elements 50, 52 and 54 limit the amount each of these elements may be extended and the flanged end portion on the elements 48 prevents the latter from being withdrawn from the handle assembly 58.

In FIGURE 10 of the drawings there may be seen a slightly modified handle asembly generally referred to by the reference numeral 58' and which is substantially identical to the handle assembly 58 except that it is provided with a threaded bore 56' in lieu of a smooth bore. In addition, the element 48' corresponding to the element 48 is externally threaded as at 60 on its base end and is threadedly engaged in the bore 56'. Further, the element 50' corresponding to the element 50 is externally threaded as at 62 on its base end and is removably threadedly engaged in a threaded bore 64 formed in the end of the element 48' remote from the externally threaded end of the element 48'. Of course, elements 52' and 54' (not shown) corresponding to the elements 52 and 54 are also provided and removably threadedly engaged with the elements 50' and 52', respectively. Therefore, one form of the fishing rod assembly 14 includes telescoping rod elements and the other form of fishing rod assembly includes a plurality of rod elements which are threadedly engaged with each other.

The handle assembly 14 has the general configuration of a pistol-type hand gun including a body portion 66, a barrel portion 68 and a handgrip portion 70. The barrel portion 68 is tubular and has the bore 56 extending centrally therethrough. The end of the barrel portion 68 remote from the body portion 66 is provided with a depending eye 71 and the rear end of the barrel portion 68 opens into the interior of the body portion 66 which is hollow.

A double flanged reel 72 is mounted on a support axle 74 for rotation therewith and the opposite ends of the shaft 74 are externally threaded and include diametrically opposite flats. The shaft 74 is journalled transversely through the body portion 66 by means of suitable bearing assemblies 76 and 78 and retaining nuts 80 and 82 are threadedly engaged on the opposite ends of the shaft 74. A diametrically extending crank 84 is provided and includes a pair of laterally directed opposite end handle portions 86. The crank 84 is removably secured on either end portion of the shaft 74 by means of a nut 88 and it is to be understood that the crank includes an opening 90 formed through its central portion which is complementary to the non-circular end portion of the shaft 74 and which will therefore serve to lock the crank 84 against rotation relative to the shaft 74 and therefore enable the latter to be turned in response to rotation of the crank 84.

A length of fishing line 92 is partially wound on the reel 72 and extends through an opening 94 formed in the forward end of the body portion 66. The line 92 then extends through the eye 71 and the eye 96 carried by the free end of the rod element 54.

A combined trigger and friction drag and brake member generally referred to by reference numeral 98 pivotally supported within the body portion 66 by means of a pivot fastner 100. The member 98 includes a trigger defining projection 102 which projects downwardly through an opening 104 formed in the body portion 66 and the member 98 includes a drag friction surface 106 and a braking friction surface 108. An expansion spring 110 is connected between the member 98 and the anchor lub 112 defined in the rear portion of the body portion 66 and yieldingly urges the member 98 toward a position with the surface 106 engaging the flange 114 of the reel 72. However, as may best been seen from FIGURE 4 of the drawings, slight rearward movement of the trigger element 102 will cause the surface 106 to be moved out of engagement with the flange 114 and to thereby allow free turning of the reel 72. Further, a strong rearward pull on the trigger element 102 will cause the surface 108 to tightly frictionally engage the flange 114 and to therefore brake the reel 72 against rotation.

A friction drag release member 116 is pivotally secured in the rear portion of the body portion 66 by means of a pivot pin 118 and includes an abutment surface 120 which is engageable with a confronting surface portion of a rearwardly extending projection 122 carried by the member 98 when the rear end 124 of the member 116 is urged upwardly in the direction indicated by the arrow 126 in FIGURE 4 of the drawings to shift the member 98 from a position thereof with the surface 106 engaged with the flange 114. Thus, inasmuch as the rear end portion of the member 116 projects through a rearwardly facing opening 128 formed in the body portion 66, the rear end 124 may be engaged by the thumb of the user as the fishing rod assembly 14 to momentarily release the friction brake mechanism of the rod assembly 14 during casting operations.

One side of the body portion 66 includes an opening 130 through which the reel 72 may be withdrawn and the opening 130 is closed by means of an outer closure wall 132 through which the shaft or axle 74 extends. The closure 132 supports the bearing assembly 78 and the latter, in conjunction with the nut or fastener 82 serves to retain the closure wall 132 in position closing the opening 130 and securing the reel 72 within the body portion 66.

The inner side wall 24 of the housing 16 includes an upwardly opening notch 134 which receives the portions of the body portion 66 extending about the opening 130.

In operation, the free end of the line 92 may have any suitable lure or baited hook attached thereto in the conventional manner. After the fishing rod assembly 14 has been withdrawn from the holster assembly 12, by the elements 48', 50' and the associated elements corresponding to the elements 52 and 54 may be threadedly engaged with each other and with the barrel portion or the elements 48, 50, 52 and 54 may be extended. Then, the fishing rod assembly 14 may be supported by the user's hand encircling the handgrip portion 70 and moved in a casting manner while urging the toothed rear end portion 124 upwardly to its limit of upward travel to release the reel 72 with the user of the fishing rod assembly 14 ending his casting stroke in the manner in which a person would aim a revolver or pistol. Thereafter, the rear end portion 124 may be released so as to apply a friction brake on the reel 72 and the trigger 102 may be pulled tightly rearwardly whenever desired to prevent further playout of the line 92 from the reel 72. In addition, the line 92 may be wound back upon the reel 72 by rotating the shaft 74 through the crank 84.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated fishing rod assembly including front and rear ends and defining an elongated rod portion at its front end and handle means at its rear end, said handle means at the rear end of said rod assembly adapted to be at least partially encircled by one hand of a user, a fishing reel journaled from said assembly adjacent said handle means, brakes means operatively associated with said reel and including an actuator portion freely oscillatable between first and second positions and through a third intermediate position between said first and second positions, said brake means including means for applying frictional drag on said reel when said actuator is in said first position, means for applying variable amounts of friction braking on said reel when said actuator is in said second position and means affording free rotation of said reel, independent of friction drag thereon, when said actuator is in said third position, and means yieldingly urging said actuator portion toward said first position.

2. The combination of claim 1 wherein said handle means includes a body portion, a handgrip projecting outwardly of said handle means, said actuator portion including a trigger disposed forward of the base end of said handgrip and mounted for movement toward and away from the latter between said second and first positions respectively, and adapted to be engaged by the trigger finger of the hand in which said handgrip is gripped.

3. The combination of claim 2 including a release member movably supported from said handle means for shifting between first and second limit positions and disposed adjacent the base end of said handgrip and adapted to be engaged, for shifting between its first and second position by the thumb of a person whose hand is encircling said handgrip, said release member being operative to shift said actuator portion from its first position to its third position in response to movement of said release member from its first position to its second position.

4. The combination of claim 2 wherein said trigger is generally centered intermediate opposite sides of said body whereby said handgrip may be held in either the left hand or the right hand with said trigger in position to be readily manually shifted in position with the trigger finger of either hand used to grip said handgrip.

5. The combination of claim 2 including a shaft journalled transversely through said body portion forward of said handgrip, said reel being driven from said shaft, and crank means selectively removably mountable on the opposite ends of said shaft against rotation relative thereto whereby said crank means may be disposed on the right and left hand sides of said body when said handgrip is being gripped by left and right hands, respectively.

6. The combination of claim 2 wherein said elongated rod portion has its rear end portion removably supported from said handle means.

7. The combination of claim 1 wherein said elongated rod portion comprises a plurality of telescopingly engaged extendable rod sections including a base section adjacent said handle means, said base section being telescopingly supported from said handle means for at least partial longitudinal telescopic retraction of said base section into said handle means.

References Cited

UNITED STATES PATENTS

| | | | |
|---|---|---|---|
| 1,406,268 | 2/1922 | Madej | 43—18 |
| 1,605,710 | 11/1926 | Ford | 43—20 |
| 1,903,798 | 4/1933 | Turner | 43—26 X |
| 2,225,719 | 12/1940 | Shotton | 43—20 X |
| 2,342,993 | 2/1944 | Wright | 43—20 |
| 2,352,903 | 7/1944 | Lawrenz | 43—23 |
| 2,599,219 | 6/1952 | Berchak | 43—20 |
| 2,984,432 | 5/1961 | Clark | 242—84.53 X |
| 3,021,101 | 2/1962 | Gliebe | 224—5 X |

WARNER H. CAMP, Primary Examiner